July 21, 1942.                H. T. KRAFT                2,290,687
                               INNER TUBE
                          Filed April 29, 1940

INVENTOR
*Herman T. Kraft*
BY *Evans & McCoy*
ATTORNEYS

Patented July 21, 1942

2,290,687

UNITED STATES PATENT OFFICE 2,290,687

INNER TUBE

Herman T. Kraft, Akron, Ohio, assignor to The General Tire & Rubber Company, Akron, Ohio, a corporation of Ohio Application April 29, 1940, Serial No. 332,187

3 Claims. (Cl. 152—342)

This invention relates to improvements in inner tubes for pneumatic tires. It particularly relates to a safety inner tube that will retain air after a blowout.

Safety tubes having a plurality of circumferential compartments which communicate with each other through small orifices have heretofore been proposed. The tubes which have been successful have inner walls reinforced by bias cut fabric and the air is permitted to escape from the inner compartment within a minute or so after blowout occurs. No provision is made for retaining sufficient air to enable the car to be driven to a repair station if the blowout should occur through a relatively small hole, as is ordinarily the case.

While it is much less costly to build compartment type tubes entirely of rubber or similar rubber-like extensible material and such tubes have been proposed, they have not heretofore been successful. This lack of success was in a large measure due to the improper arrangement of the compartments and the fact that the flexible walls operated to seal connecting orifices during inflation and deflation, thus greatly increasing the time required for such procedures.

It is an object of this invention to provide a safety tube which affords adequate protection in the case of large blowouts but which retains sufficient air to enable one to reach a repair station in the case of small blowouts.

It is another important object of the present invention to provide a safety type inner tube of more economical construction which is readily inflated and deflated.

Another object of this invention is to provide an inner tube which may be constructed substantially entirely of rubber or extensible material, and which may be readily inflated and deflated through a single valve stem.

A further object of this invention is to provide an inner tube for pneumatic tires, which tube gives adequate protection when a large blowout occurs, which may be readily inflated and deflated, and which will permit the operation of the tire for a substantial period after a small blowout or puncture occurs.

Other objects will be apparent from the following description of the invention as illustrated by the drawing, in which.

Figure 1:
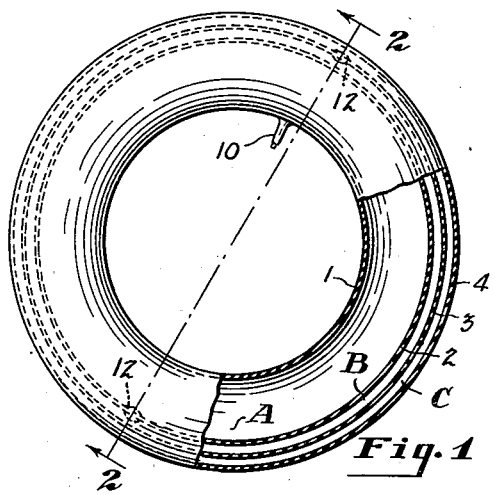
Figure 1 is a side elevational view, partly in section, of a tube embodying the present invention.
Figure 2:
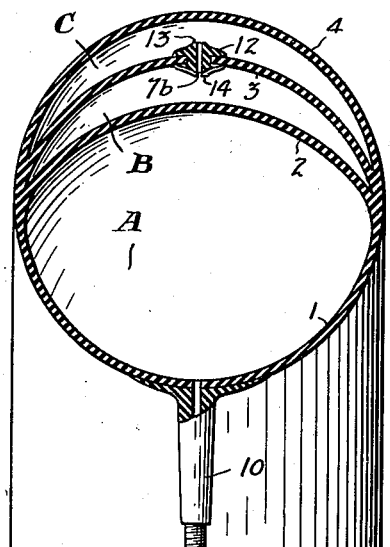
Fig. 2 is a section on the line 2—2 of Fig. 1.

Referring more particularly to the drawing wherein like parts are designated so far as is possible by like letters and numerals of reference throughout the several views, my improved tube has at least three connected circumferential compartments designated respectively by A, B, and C. These compartments are fluid-tight except for the intercommunication provided by hereinafter described restricted communication ports, and are arranged so that at least one of the two walls of each compartment is also a wall of another compartment.

The inner circumferential compartment A is formed of an outer wall 2 and an inner wall 1 which carries the valve stem 10 and is adapted to come in contact with the bead portion of the tire casing, both walls having different transverse curvatures. One or more intermediate circumferential compartments B, which preferably have a crescent shaped cross section, cover the outer wall 2 of the inner compartment A, the inner wall 2 of the innermost intermediate compartments being the outer wall of the inner compartment A. The outer circumferential compartment, which is also substantially crescent shaped, is formed by the outer wall 3 of the outermost intermediate compartment B and the outer wall 4 of the tube.

Each of the walls separating compartments and wall 4 has a different radius of curvature and extends around the entire circumference of the tube. All the walls are preferably formed entirely from an unreinforced rubber compound or from a stretchable homogeneous rubber-like material.

A restricted communication port 7, preferably in a suitable grommet 12, is provided in each wall separating the circumferential compartments, so that the inflation fluid admitted to the inner compartment A from the valve stem 10 may pass successively through the intermediate compartments B and into the outer crescent shaped compartment C.

In order to obtain the benefits of this invention, a single circumferential intermediate compartment B has been found to be sufficient, the inner and outer walls of the compartment being respectively the outer wall 2 of the compartment A and the inner wall 3 of compartment C. The diameter of annular compartment A is less than that of intermediate annular compartment B, and that of compartment B is in turn less than that of the outer annular compartment C. Preferably the cross sectional area of the inner compartment A is relatively larger than the cross sectional areas of either of compartments B and C. Annular crescent shaped compartments B and C are preferably substantially equal in cross sectional area.

Figures 5, 6:
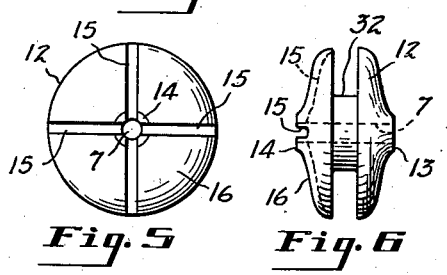
Fig. 5 is an end elevational view of a suitable grommet or collar which is disposed in each wall separating two compartments and which contains the restrictive communication ports.
Fig. 6 is a side elevation of the grommet of Fig. 5.

The port 7b between compartment B and outer compartment C is preferably situated about 180° around the circumference of the tube from the port 7a in the wall between the inner compartment A and compartment B. Means is provided for closing the port 7b between the intermediate and outer compartments B and C, respectively, when air is suddenly removed from the outer compartment, as when blowouts occur. Referring particularly to Figs. 5 and 6 where the preferred grommet 12, having a port 7 corresponding to 7a or 7b extending through the neck portion 32, is separately illustrated, such means may include a raised, substantially flat sealing surface 13 around the port 7. Means, such as raised portions 14 formed by slots 15 in the surface 16 of suitable grommets 12 disposed in the walls of the intermediate compartments, prevent the sealing of the ports 7a and 7b by a wall of the intermediate compartment B during inflation or deflation of the tube.

When the tube is inflated the wall 2 is forced by the inflation fluid against wall 3, but the ports 7a and 7b are maintained open by the projections 14 which permit air to flow through the slots 15. Since the compartment C is impervious to air, a complete closing of port 7b by coaction of the flat surface 13 and the wall 4 is prevented. When the tube is being deflated through the valve stem 10, the ports 7a and 7b are maintained open by means of the projections 14, thus permitting relatively free flow of air from the compartments B and C.

Figure 3:
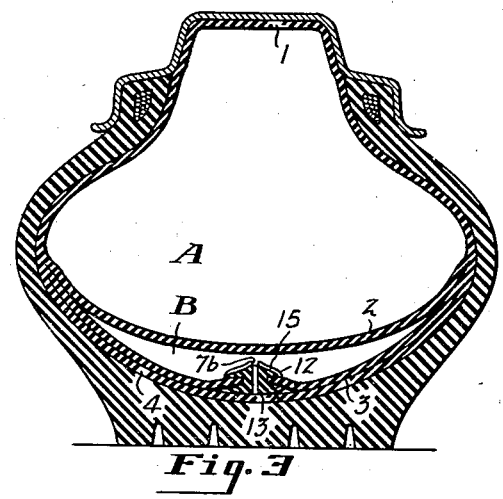
Fig. 3 is a cross sectional view of a portion of a tire in contact with the road, showing the operation of the tube soon after a blowout has occurred.

The action of the tube when a blowout occurs depends to a large extent on the character of the hole in the tire casing. When, as is usually the case, a relatively small hole is formed by the abrasion or heating of a small area, the air in compartment C is suddenly expelled, but the wall 3 expands against the wall 4, closing the port 7b by the coaction of wall 4 and the raised flat surface 13 adjacent the port 7b. The operator of the vehicle is then permitted to drive a considerable distance with a reduced pressure in the tire, as is shown by Fig. 3, before abrasion or local heating ruptures wall 3.

Figure 4:
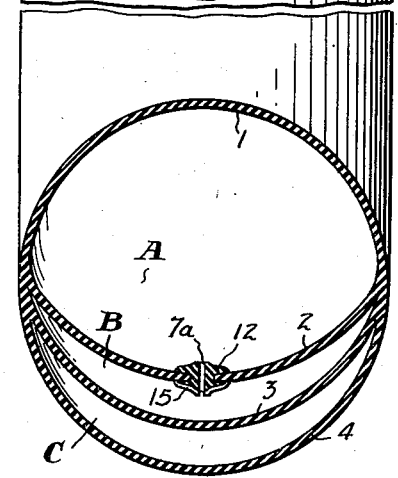
Fig. 4 is a similar view of a different portion of the same tire after the outer wall of a second compartment in the tube has blown, showing the second stage in the operation of the tube.

When, as is rarely the case, a large hole occurs in the tire, walls 3 and 4 will, of course, rupture in rapid succession, expelling air in compartments B and C. If the pressure in compartment A is not sufficiently reduced by this loss of air, the wall 2 of compartment A will also burst. In the usual severe case the loss of the air in compartments B and C sufficiently relieves the pressure in compartment A to prevent rupture of the wall 2 and the tire is permitted to deflate slowly through the communication port 7a from the position shown in Fig. 4. However, under such extreme conditions as when the walls of all compartments are ruptured, it has been found that there is sufficient delay between the successive rupture of walls 4, 3, and 2 to provide a short interval between the stages illustrated in Figs. 3 and 4 and give the effect of a gradual decrease in pressure. Such effect is sufficient to prevent the loss of control usually caused by the sudden change in driving conditions.

It is to be understood that variations and modifications of the specific devices herein shown and described for purposes of illustration, may be made without department from the spirit of the invention.

What I claim is:

1. An inner tube for pneumatic tires comprising an inner circumferential compartment, an intermediate circumferential compartment and an outer circumferential compartment, said compartments each having only two walls of substantially unreinforced rubber-like material having different radii of curvature, a restricted communication port in each wall separating two compartments, means including a raised flat surface for closing the port in the wall separating the intermediate and outer compartments when inflation fluid is suddenly removed from the outer compartment, and means including an outwardly extending projection for preventing the closing of the port between the inner compartment and intermediate compartment when inflation fluid is suddenly removed from the intermediate compartment.

2. An inner tube for pneumatic tires comprising an inner circumferential compartment, an intermediate circumferential compartment and an outer circumferential compartment, said compartments each having only two walls of substantially unreinforced rubber-like material having different radii of curvature, a restricted communication port in each wall separating two compartments, means for closing the port in the wall separating the intermediate and outer compartments upon sudden loss of air from the outer compartment, and means for preventing the closing of the port between the inner compartment and intermediate compartment when inflation fluid is suddenly removed from the intermediate compartment.

3. An inner tube for pneumatic tires having a substantially round cross section and comprising an inner annular compartment, an intermediate annular compartment of substantially crescent shaped cross section and an outer annular compartment substantially crescent shaped in cross section, said inner annular compartment being of relatively larger cross sectional area and of smaller average diameter than the intermediate and outer compartments, and communicating with said intermediate compartment through a restrictive communication port, a restricted communication port in the wall separating the intermediate and outer compartments, means including a flat surface surrounding the outer terminus of the port between the intermediate and outer compartments for sealing this port upon sudden loss of inflation fluid from said outer compartment, a projection adjacent the inner terminus of the port between the intermediate and outer compartments for preventing closure of the port when air is expelled from the intermediate compartment, means including a projection adjacent the outer terminus of the port between the inner and intermediate compartments for preventing closure of this port when air is suddenly expelled from the intermediate compartment.

HERMAN T. KRAFT.